Figure 1:
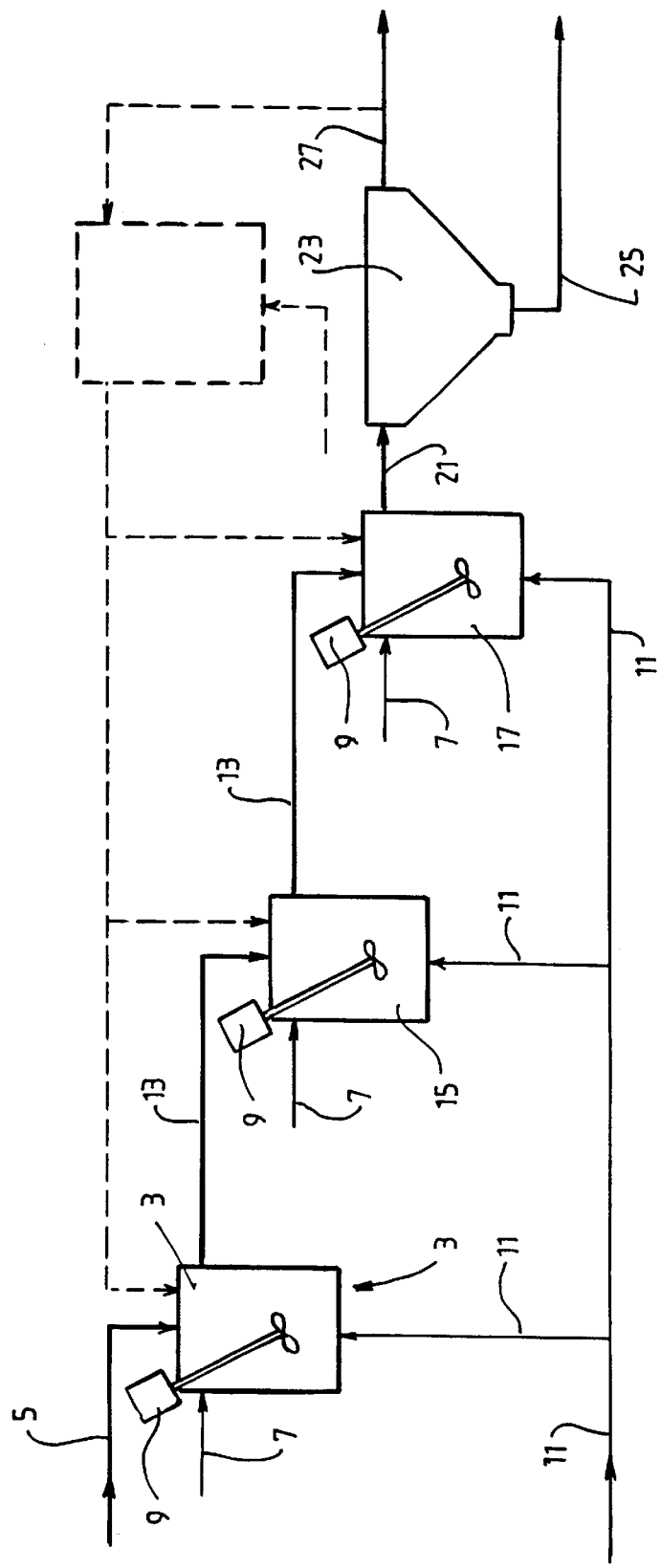

United States Patent [19]
Arias

[11] Patent Number: 6,143,259
[45] Date of Patent: Nov. 7, 2000

[54] TREATMENT OF PYRITE AND ARSENOPHRITE CONTAINING MATERIAL WITH FERRIC IONS AND SULFUR DIOXIDE/OXYGEN MIXTURE TO IMPROVE EXTRACTION OF VALUABLE METALS THEREFROM

[76] Inventor: Jesus A Arias, 75 Perry St., Apt. 4A, New York, N.Y. 10014

[21] Appl. No.: 09/011,900
[22] PCT Filed: Aug. 23, 1996
[86] PCT No.: PCT/AU96/00529
§ 371 Date: Jun. 16, 1998
§ 102(e) Date: Jun. 16, 1998
[87] PCT Pub. No.: WO97/08349
PCT Pub. Date: Mar. 6, 1997

[30] Foreign Application Priority Data

Aug. 23, 1995 [AU] Australia ................... PN4985

[51] Int. Cl.⁷ ........................... C22B 11/00; C22B 15/00; C22B 19/00; C22B 23/00
[52] U.S. Cl. ........................ 423/47; 423/110; 423/153; 423/154
[58] Field of Search .................. 423/47, 153, 154, 423/110

[56] References Cited

U.S. PATENT DOCUMENTS

| | | |
|---|---|---|
| 3,529,957 | 9/1970 | Kunda et al. . |
| 3,753,691 | 8/1973 | Grover et al. ............... 423/27 |
| 3,929,597 | 12/1975 | Cottam et al. . |
| 4,097,271 | 6/1978 | Swinkels et al. . |
| 4,256,553 | 3/1981 | Baczek et al. ............... 423/27 |
| 4,337,128 | 6/1982 | Haakonsen . |
| 4,889,694 | 12/1989 | Spink et al. ............... 423/110 |

FOREIGN PATENT DOCUMENTS

| | | |
|---|---|---|
| B22487/83 | 6/1984 | Australia . |
| B69934/87 | 9/1987 | Australia . |
| 87920/91 | 5/1992 | Australia . |
| B70210/91 | 8/1993 | Australia . |
| 1044022 | 12/1978 | Canada . |
| WO 98/12699A1 | 12/1989 | WIPO . |

OTHER PUBLICATIONS

Tiwari, et al., "Leaching of high–solids, attritor–ground chalcopyrite concentrate by in situ generated ferric sulfate solution" Metallurgical Trans. B vol. 11B, pp. 89–93, Mar. 1980.

*Primary Examiner*—Steven Bos
*Attorney, Agent, or Firm*—Barrigan & Moss; Dolly Kao; Dennis Moss

[57] ABSTRACT

A method of treating a mined material which includes a sulphide mineral and iron or a concentrate of the mined material to improve the recovery of a valuable metal from the sulphide mineral is disclosed. The method comprises: (i) oxidising the sulphide mineral in the presence of ferric ions to make the valuable metal in the sulphide mineral more accessible to extraction; and (ii) oxidising ferrous ions generated in step (i) or derived from iron in the mined material with a mixture of sulphur dioxide and oxygen to produce ferric ions for step (i).

11 Claims, 8 Drawing Sheets

FIG_4.

TREATMENT OF PYRITE AND ARSENOPHRITE CONTAINING MATERIAL WITH FERRIC IONS AND SULFUR DIOXIDE/OXYGEN MIXTURE TO IMPROVE EXTRACTION OF VALUABLE METALS THEREFROM

The present invention relates to a method to enhance the extraction of valuable metals, such as gold and silver, from sulphide minerals.

The present invention relates particularly, although by no means exclusively, to a method to enhance the extraction of valuable metals from sulphide minerals that include iron or which form part of ore bodies that include iron.

The present invention relates more particularly, although by no means exclusively, to a method to enhance the extraction of gold from iron sulphide minerals, such as pyrite ($FeS_2$) and arsenopyrite (FeAsS).

A large part of the accessible gold mineral reserves and resources are associated with sulphide minerals, such as pyrite and arsenopyrite. In many cases, these sulphides yield gold recoveries below 80% using conventional cyanidation methods and, as a consequence, the sulphide minerals are classified as refractory. The main reason for the low gold recoveries is that it is common to find some of the gold as very finely disseminated particles inside the sulphide crystal matrix and therefore the gold is not readily accessible by conventional cyanidation methods. The particle size of the gold inside the sulphide matrix can range from a few microns to submicrons.

In order to efficiently recover gold (as well as other metals) from refractory sulphide minerals it is first necessary to break down the sulphide minerals, for example by oxidising the sulphide minerals. The gold can then be recovered by conventional gold recovery methods, such as cyanidation treatment.

It is known to oxidise sulphide minerals by roasting and by a range of hydrometallurgical methods including pressure leaching and bioleaching.

It is an object of the present invention to provide an alternative method of treating refractory gold-containing sulphide minerals based on hydrometallurgical oxidation of sulphide minerals to improve the recovery of valuable metals from the sulphide minerals.

According to the present invention there is provided a method of treating a mined material or a concentrate of the mined material to improve the recovery of a valuable metal from the mined material, the mined material including a sulphide mineral which contains the valuable metal, and the mined material including iron, which method comprises:

(i) oxidising the sulphide mineral in the presence of ferric ions to produce ferrous ions, the purpose being to make the valuable metal in the sulphide mineral more accessible to extraction; and (ii) oxidising the ferrous ions generated in step (i) or present in the mined material with a mixture of sulphur dioxide and oxygen to produce ferric ions for use in oxidising the sulphide mineral in step (i).

The present invention is based on the realisation that:

(a) oxidation of a refractory sulphide mineral in the presence of ferric ions to break down the sulphide mineral and produce ferrous ions;

(b) oxidation of ferrous ions by sulphur dioxide/oxygen to generate ferric ions; and (c) the use of the sulphide mineral or an ore body that contains the sulphide mineral as a source of the ferrous/ferric ions;

is an effective, industrially realistic, process for treating the sulphide mineral to improve subsequent recovery of a valuable metal from the sulphide mineral.

The valuable metal may be any metal, such as gold, nickel, copper and zinc.

It is noted that oxidation step (i) may make the valuable metal more accessible to extraction from the sulphide mineral by releasing solid particles of the valuable metal from the sulphide mineral structure or exposing the valuable metal in the structure for dissolution of the valuable metal. In either case, the valuable metal (in solid or dissolved form) can then be extracted by any suitable means. For example, in the case of gold in a sulphide mineral, oxidation step (i) typically would release the entrapped gold particles for extraction by conventional treatments, such as cyanidation. In addition, in the case of nickel in a sulphide mineral, oxidation step (i) typically would break-down the sulphide mineral and expose nickel particles which would then pass into solution and be extracted thereafter from the solution.

It is preferred that the concentration of ferric ions be maintained above a minimum level.

It is preferred that the ratio of the concentrations of ferric to ferrous ions be maintained above a minimum level.

It is preferred that the method comprises oxidising the sulphide mineral in step (i) in the presence of a catalyst.

The catalyst may be any suitable material. A preferred catalyst is silver ions. The catalyst may be added to the mined material or the concentrate. Alternatively, or in addition, the catalyst may be derived from the mined mineral.

It is preferred that the iron be part of the sulphide mineral.

It is preferred particularly that the sulphide mineral be pyrite and/or arsenopyrite.

The term "pyrite" is understood herein to mean a non-living constituent of the earth's crust containing the compound iron sulphide having the chemical formula $FeS_2$.

The term "arsenopyrite" is understood herein to mean a mineral containing iron arsenic sulphide (FeAsS).

It is preferred that the oxidation of the ferrous ions be carried out at a temperature of at least 60° C.

It is preferred particularly that the oxidation temperature be at least 80° C.

It is preferred that the oxidation of the ferrous ions be carried out at a ratio of sulphur dioxide to oxygen of 0.5–10%.

It is preferred particularly that the ratio of sulphur dioxide to oxygen be 0.1–5%.

It is preferred more particularly that the ratio of sulphur dioxide to oxygen be 2%.

It is preferred that the oxidation of the ferrous ions and the sulphide mineral be carried out under acidic conditions.

It is preferred particularly that the oxidation of the ferrous ions and the sulphide mineral be carried out at a pH of less than 3.

The concentrate of the mined material may be formed by any suitable method steps. Typically, the concentrate is formed by a combination of crushing/grinding and flotation steps.

The oxidation steps (i) and (ii) may be carried out simultaneously in the same vessel or separately in different vessels.

The oxidation steps (i) and (ii) may be carried out on a continuous or a batch basis.

The oxidation step (i) may be carried out by percolation or by any other suitable means of contacting a solution containing ferric ions and the sulphide mineral.

The sulphur dioxide used in the oxidation step (ii) may be provided from any suitable source. For example, the sulphur dioxide may be provided by burning sulphur containing solids to produce sulphur dioxide. Other possible sources of sulphur dioxide are flue or stack emissions and liquid sources.

The oxygen used in the oxidation step (ii) may be provided from other suitable sources, such as air.

According to the present invention there is also provided a method of extracting a valuable metal from a sulphide mineral comprising:

(a) the treatment step or steps described in the preceding paragraphs; and (b) an extraction step comprising extracting the valuable metal.

The valuable metal may be separated and recovered by any suitable extraction method steps.

Typically, where the valuable metal is gold, the gold is recovered by cyanidation.

Another option for the extraction of gold is by the use of a lixivant such as thiourea.

The method of the present invention is particularly, although by no means exclusively, adapted to enhance the extraction of gold from pyrite, arsenopyrite, and other gold bearing minerals that contain iron.

Without wishing to be bound by theory, the applicant believes that the oxidation of pyrite and ferrous ions follow the following stoichiometric reactions:

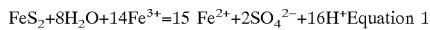

$FeS_2+8H_2O+14Fe^{3+}=15\ Fe^{2+}+2SO_4^{2-}+16H^+$ Equation 1

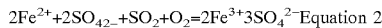

$2Fe^{2+}+2SO_{42-}+SO_2+O_2=2Fe^{3+}3SO_4^{2-}$ Equation 2

The applicant also believes that similar reactions apply to the oxidation of arsenopyrite.

It is noted from equation 1 that oxidation of pyrite by ferric ions under acidic conditions:

(i) breaks down pyrite so that valuable metals, such as gold, in the pyrite are in a more accessible form; and (ii) produces ferrous ions.

It is noted from equation 2 that oxidation of ferrous ions by a mixture $SO_2/O_2$ produces a source of ferric ions to react with further pyrite.

In accordance with the present invention the pyrite itself provides a source of ferrous/ferric ions for equations 1 and 2.

A preferred flowsheet for the method of the present invention is illustrated in FIG. 1 and described in the following paragraphs in the context of pyrite.

With reference to the figure, a mined material which includes gold-bearing pyrite or a concentrate of the mined material is typically slurried at a predetermined pulp density with water and is supplied via line 5 to a reaction vessel 3. The slurry is mixed in the vessel 3 by means of an agitator 9 and the temperature controlled via cooling or heating water supplied to the vessel 3 via line 7. Simultaneously, a mixture of $SO_2$ and $O_2$ is sparged into the vessel 3 via line 11.

It is noted that the slurry may be mixed in the vessel 3 by any suitable means other than the agitator 9, such as an air sparging draft tube. In addition, it is noted that the slurry temperature in the vessel 3 can be controlled by any other method, such as jacketed tanks. Generally, it is likely that the slurry would need to be cooled in view of the fact that the reactions in the vessel 3 are exothermic and would be expected to generate more heat than can be utilised.

In accordance with equations 1 and 2, the $SO_2/O_2$ gas oxidises ferrous ions in the slurry, which produces ferric ions, and the ferric ions and oxygen oxidise pyrite, which produces ferrous ions.

The oxidation of the pyrite breaks down the pyrite and makes gold particles entrapped by the pyrite more accessible for subsequent recovery After a predetermined residence time, slurry from vessel 3 is transferred successively via lines 13 to reaction vessels 15, 17 and is treated further in these vessels to break down any pyrite retained in the slurry. Specifically, $SO_2/O_2$ is sparged via lines 11 into the slurry in each vessel 15, 17 and agitators 9 mix the slurry in each vessel 15, 17.

It is noted that any suitable number of successive reaction vessels may be used to break down pyrite in the slurry.

By appropriate selection of a range of parameters in each vessel 3, 15, 17, such as pulp density, retention time temperature, $SO_2/O_2$ flow rates, and pH, for any given mined material it is possible to operate the method utilising iron in the pyrite as the source of ferrous/ferric ions and to continuously regenerate the ferric ions by $SO_2/O_2$ oxidation.

The slurry from the vessel 17 is transferred via line 21 to a solids/liquid separation tank 23. The solids stream from tank 23, which includes gold particles, is transferred via line 25 to a gold recovery treatment, such as cyanidation, and the liquid stream from tank 23, which includes ferrous/ferric ions, is transferred via line 27 for subsequent treatment or, optionally, for recycling to the vessels 3, 15, 17.

The applicant carried out a series of experiments on pyrite to investigate the effect of experimental conditions, such as $SO_2$ partial pressure, pulp density, and temperature, on oxidation of pyrite by ferric ions.

The experimental set-up consisted of a 1 liter five neck reactor immersed in a water bath under temperature control. A stirrer was provided to mix the contents of the reactor. The stirrer was connected to a variable speed motor.

Pyrite crystals were ground down to −325 mesh (45 μm), and solutions were prepared using reagent grade chemicals. The pyrite was over 98% pure pyrite from Huanzalà, Peru and was received as large crystals 7.5 cm in size.

The following is a description of the steps taken for each experiment.

(i) 700 ml of a solution of 0.1M ferrous sulfate 1.0M sulfuric acid was prepared using distilled-deionized water, and standardized by potassium dichromate titration. The ferrous sulphate was used as a convenient source of ferric ions.

(ii) The reactor was filled with the solution, and after it reached the desired temperature a gas mixture was sparged into the reactor. Depending on the experiment, the gas mixture comprised $O_2$ or $SO_2/O_2$ (iii) The gas mixture sparging continued for 1 to 2 hours prior to the addition of pyrite in order to saturate the solution (conditioning period).

(iv) Just before pyrite was added, a solution sample was taken in order to determine the ferric ion concentration and to confirm the standardization of total iron.

(v) One neck of the reactor was opened and the ground pyrite mineral was carefully put into the solution. Immediately the stirring speed was increased to 500 rpm to ensure full suspension of particles.

(vi) Samples were taken at predetermined periods of times. The sampling frequency was higher for the first 2 hours of each experimental run.

Figure 2:
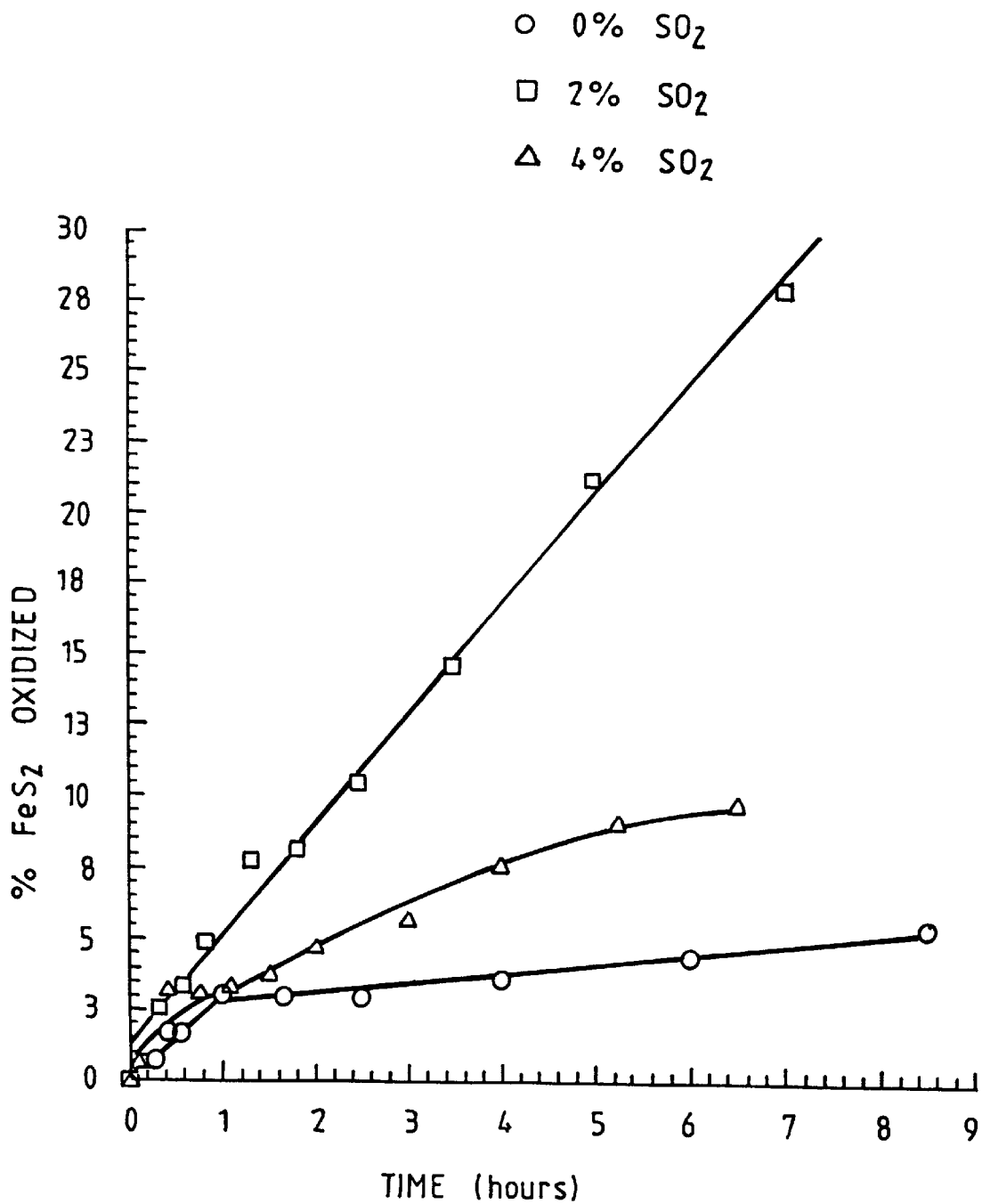
Figure 3:
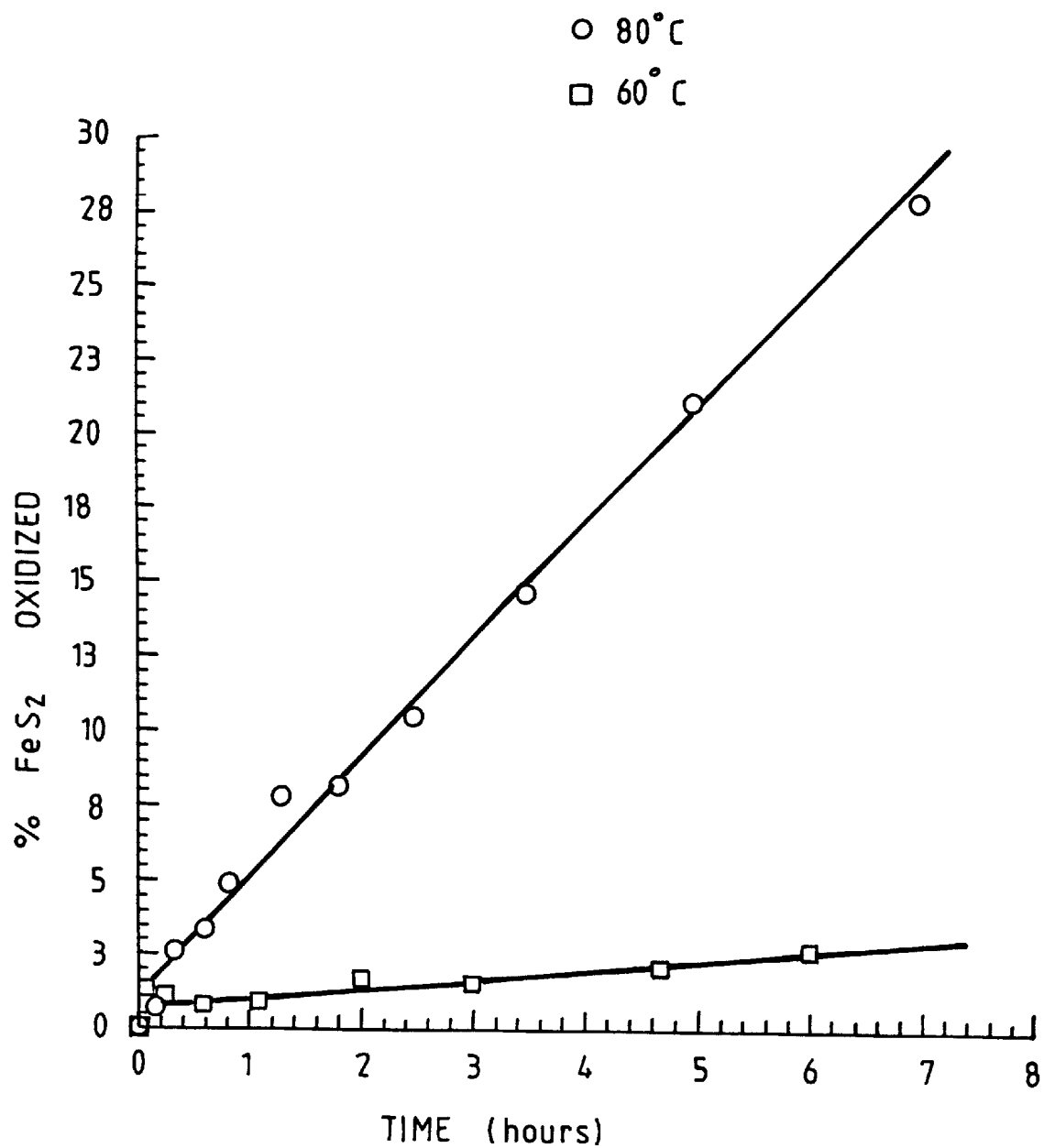
Figure 4:
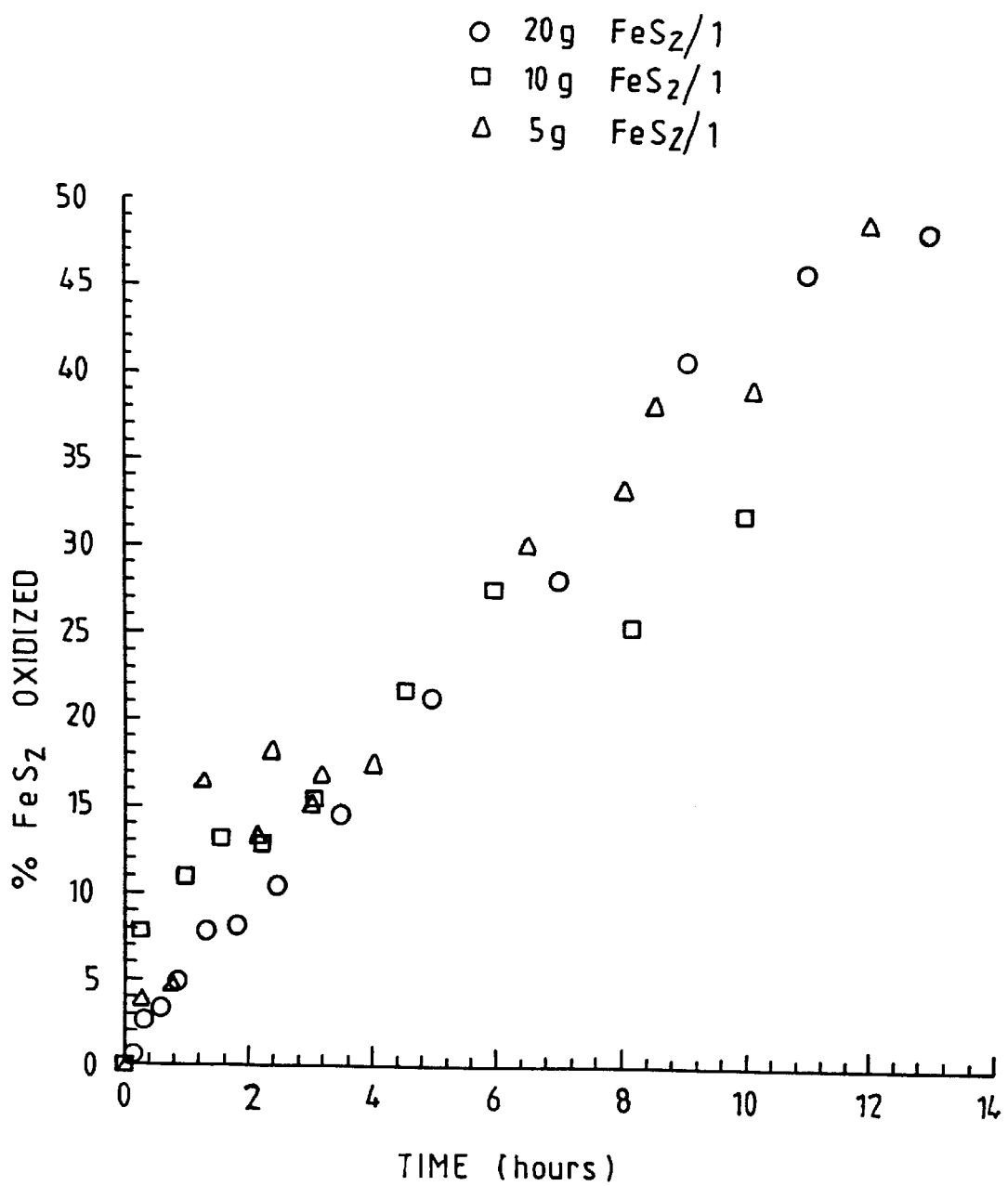

The results of the experiments are illustrated in FIGS. 2 to 4.

The effect of the gas composition on pyrite oxidation was investigated in experiments carried out at 80° C. with concentrations of 0%, 2%, and 4% $SO_2$. The results are shown in FIG. 2.

The figure shows that the rates of pyrite oxidation were constant with respect to time for each experiment. However, a significant increase of the oxidation rate was caused by the presence of $SO_2$ in the gas mixture and the maximum rate was obtained at 2% sulfur dioxide.

The gas composition of 2% $SO_2$ produced the optimum conditions for the oxidation of ferrous sulfate in acid solutions at 80° C. After 60 minutes of solution conditioning, over 90% of its iron was oxidized to ferric ions. As pyrite was added, ferric ions were consumed by pyrite oxidation and regenerated by ferrous ion oxidation with the $SO_2/O_2$ gas mixture. At these experimental conditions, the regeneration rate of ferric ions was always higher than its consumption rate, and therefore the ferric ion concentration was always high, above 98% of total iron in solution.

After 90 minutes of solution conditioning, with a gas composition of 4% $SO_2$, iron in solution was oxidized to ferric ions. As pyrite was added, ferric ions were consumed by pyrite oxidation at a faster rate than regeneration by the gas mixture. As a consequence, the ferrous ion concentration increased throughout the experiment while the oxidation rate decreased.

The effect of temperature on the pyrite oxidation rate was studied at 60° C. and 80° C. using a 2% $SO_2$ gas mixture. The results obtained are presented in FIG. 3. The figure shows that at temperatures of 60° C. and 80° C. constant oxidation rates were observed throughout the experiments.

The changes of iron species concentrations over time were compared for both experiments. At 60° C., after 1 hour of solution conditioning, about 15% of the total iron in solution was oxidized to its ferric form. When pyrite was added, the ferric ion concentration decreased very quickly to a concentration below 0.01M (10% of total iron in solution).

At 80° C., after conditioning the solution for 1 hour, most of the iron in solution was present in the ferric form, and the ferric ion concentration increased as pyrite was oxidized, keeping the ferrous iron concentration always below 0.01M.

The effect of pulp density on pyrite oxidation rate was studied in the range from 5 to 20 grams $FeS_2$/liter. The results obtained are shown in FIG. 4. The figure shows that the rates of oxidation of pyrite per unit mass were substantially equal and constant with respect to time for the range of pulp densities studied.

The applicant also carried out a series of experiments on ferrous sulphate solutions as a convenient source of ferrous ions to investigate the effect of experimental conditions on oxidation of ferrous ions by gas mixtures containing $SO_2/O_2$.

The experimental set-up consisted of a laboratory size reactor with a stirrer controlled by a variable speed motor. The experiments were carried out on a batch basis under the following constant conditions:

(i) solution temperature=80–85° C.;
(ii) solution concentration=0.1M ferrous solution;
(iii) solution volume=1.5L; and
(iv) stirrer speed=750 rpm;

The oxidation rates were obtained by monitoring either the ferrous ion concentration or the ferric ion concentration in solution over time and performing regression analysis on the initial 60 minutes of the reaction. The slope of the linear regression was considered to be the reaction rate. A standard 0.01M potassium dichromate solution was used to titrate for the ferrous ion and a standard 0.01M EDTA solution was used to titrate for ferric ion concentration.

Figure 5:
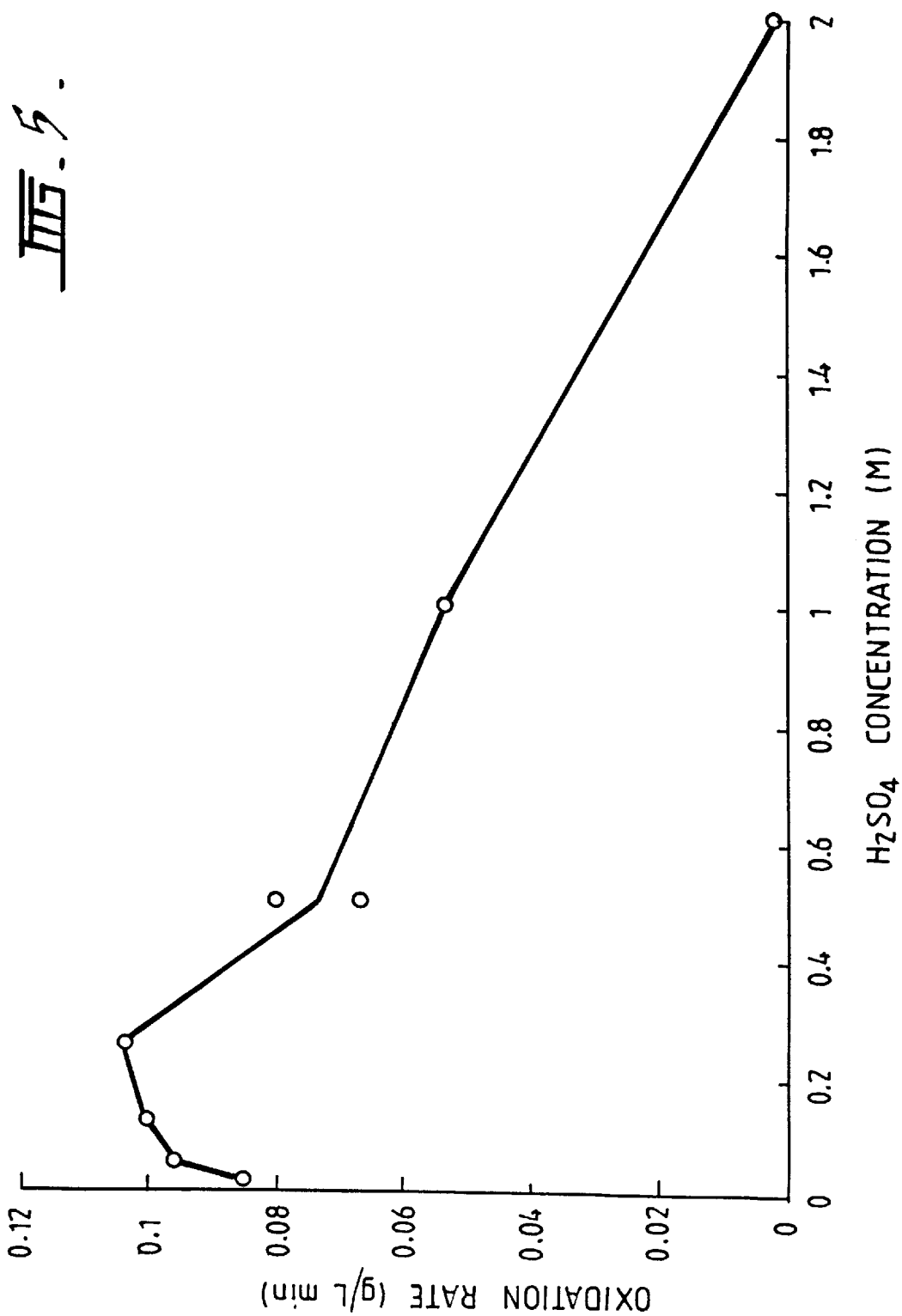
Figure 6:
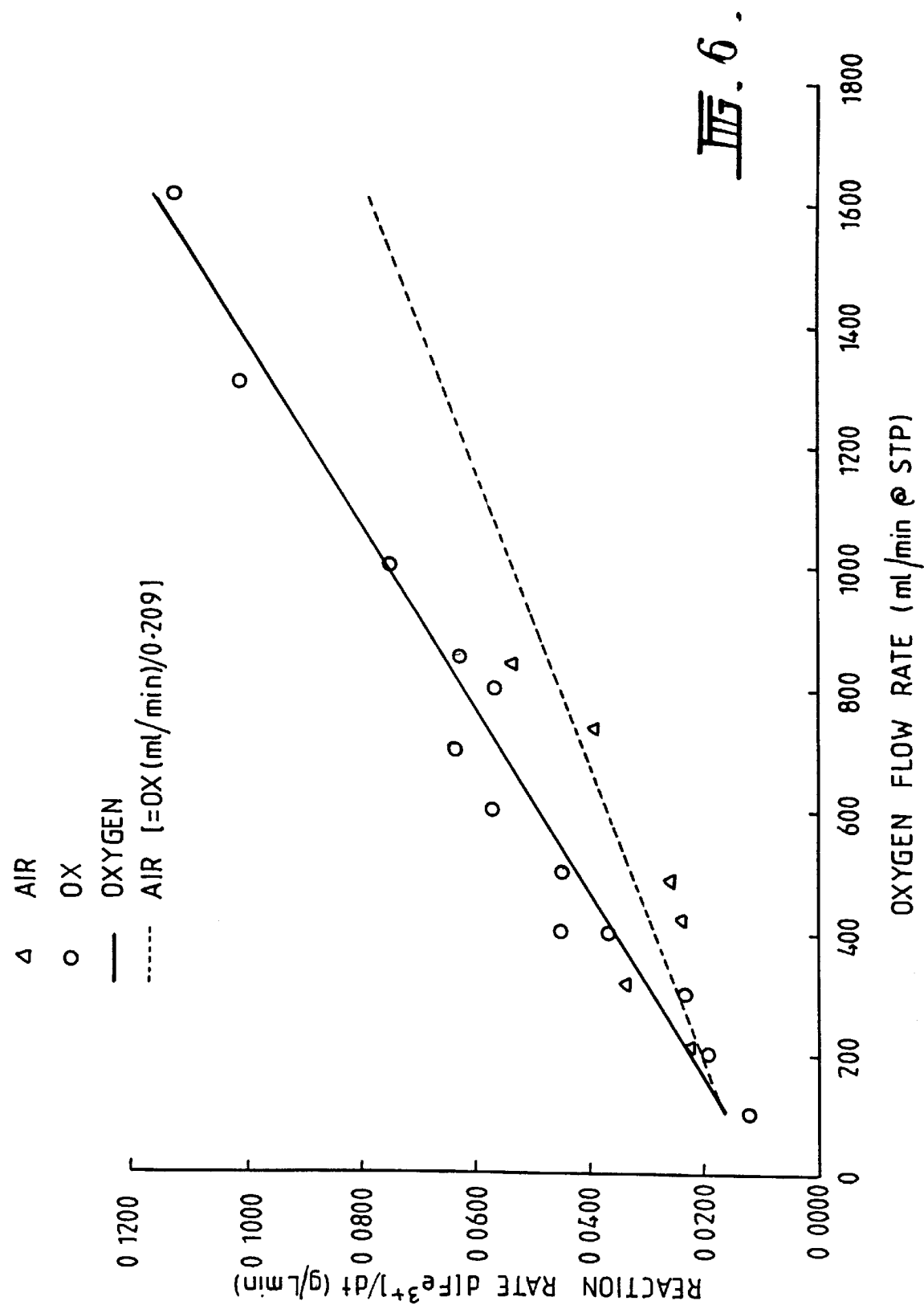
Figure 7:
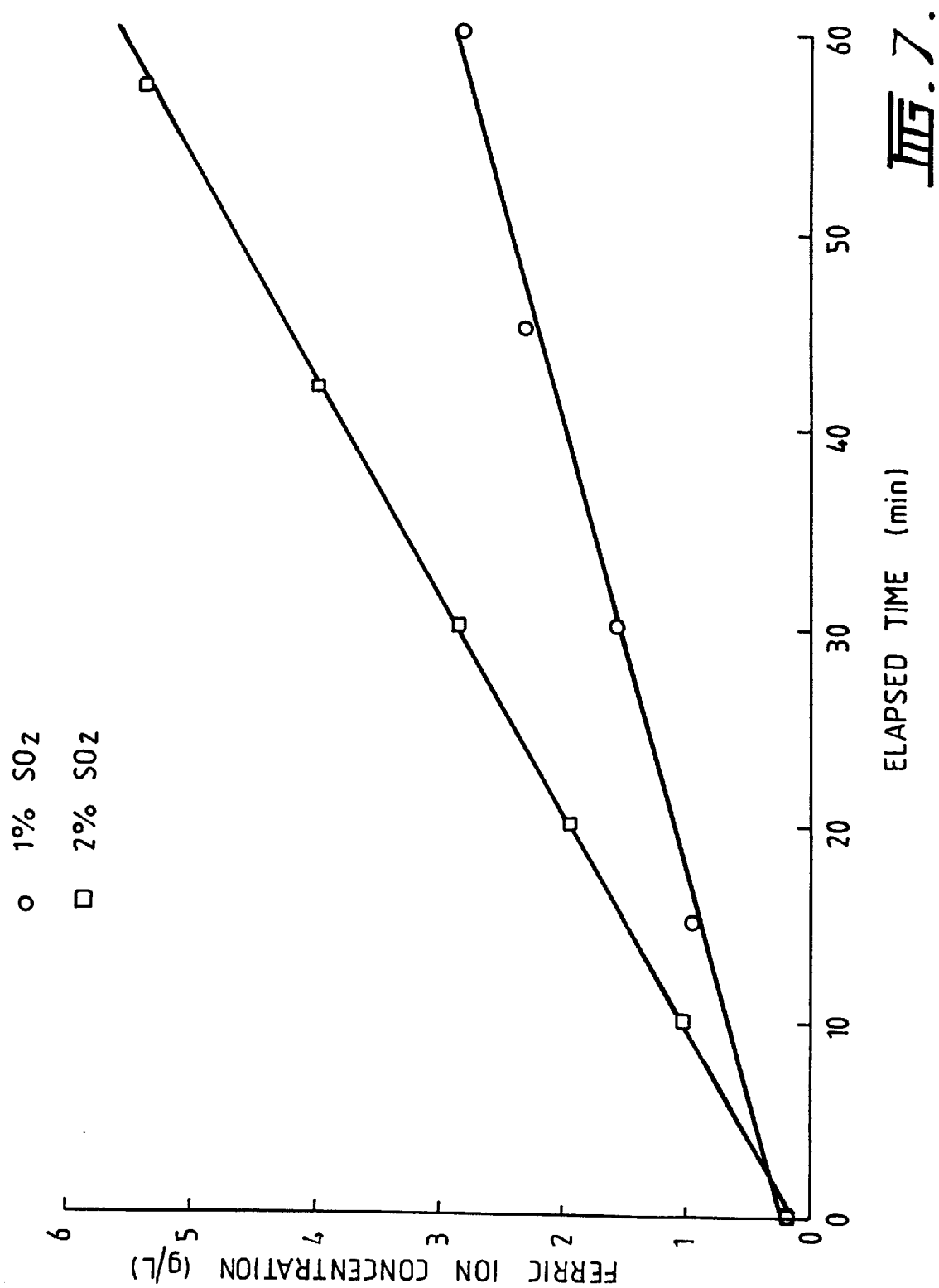

The results of the experiments are illustrated in FIGS. 5 to 7.

FIG. 5 is a plot of oxidation rates as a function of the sulfuric acid concentration. The curve indicates that an optimum acid concentration existed for the experiments. The optimum appeared to be at 0.25M sulfuric acid concentration. The exact position of this optimum was not clear from the tests but is certain to lie within the 0.1M to 0.3M range from the results in FIG. 5. The results indicate that the rate of oxidation decreased as the acid concentration increased above the optimum value.

FIG. 6 is a plot of oxidation rates as a function of oxygen flow rates. The steeper line on the figure indicates the change in oxidation rate as a function of pure oxygen flow rate. As the flow rate increased the oxidation rate increased linearly. The line of lesser slope illustrates how the partial pressure of oxygen affected the oxidation rate. Oxygen comprises about 20.9% by volume of air. Thus the partial pressure of oxygen in air is about 0.209 atm. This line also illustrates that as the net oxygen flow rate increased the oxidation rate increased in a linear fashion. However, its lesser slope indicates that as oxygen partial pressure decreases so does the oxidation rate.

FIG. 7 shows the effect of changing the $SO_2/O_2$ gas ratio on oxidation rates. The slope of each line is the oxidation rate. At an $SO_2/O_2$ gas ratio of 1% the oxidation rate was significantly lower than at a ratio of 2%. This result indicates that a 2% ratio was much more effective for oxidation than 1%. The results are consistent with the previously described results of studies into the oxidizing characteristics of an $SO_2/O_2$ gas mixture in an acid solution.

The applicant also carried out an experiment on an ore body that contained iron sulphides to investigate the recovery of nickel from the sulphides. The iron sulphides were in the form of pyrite and pyrrhotite (FeS) and the experimental work was based on deriving ferrous/ferric ions solely from the ore body—with no external addition of iron.

The experimental set up consisted of a laboratory size reactor with a stirrer controlled by a variable speed motor. The experiment was carried out on a batch basis under the following constant conditions:

(i) initial Fe concentration (M/1): 0;
(ii) initial $H_2SO_4$ concentration (M/1): 0.12;
(iii) temperature: 81.5° C.; and
(iv) ratio of $SO_2:O_2$: 2%

A ground sample of the ore body was mixed with water to form a slurry. The slurry and acid were placed in the reactor and $SO_2/O_2$ was sparged into the slurry for a period of 14 hours. Samples were taken periodically and analysed.

Over the course of the experiment there was a progressive breakdown of the sulphide minerals with, by way of example, 93% of the nickel passing into solution. The breakdown was due to ferric ion oxidation of the sulphide minerals.

Figure 8:
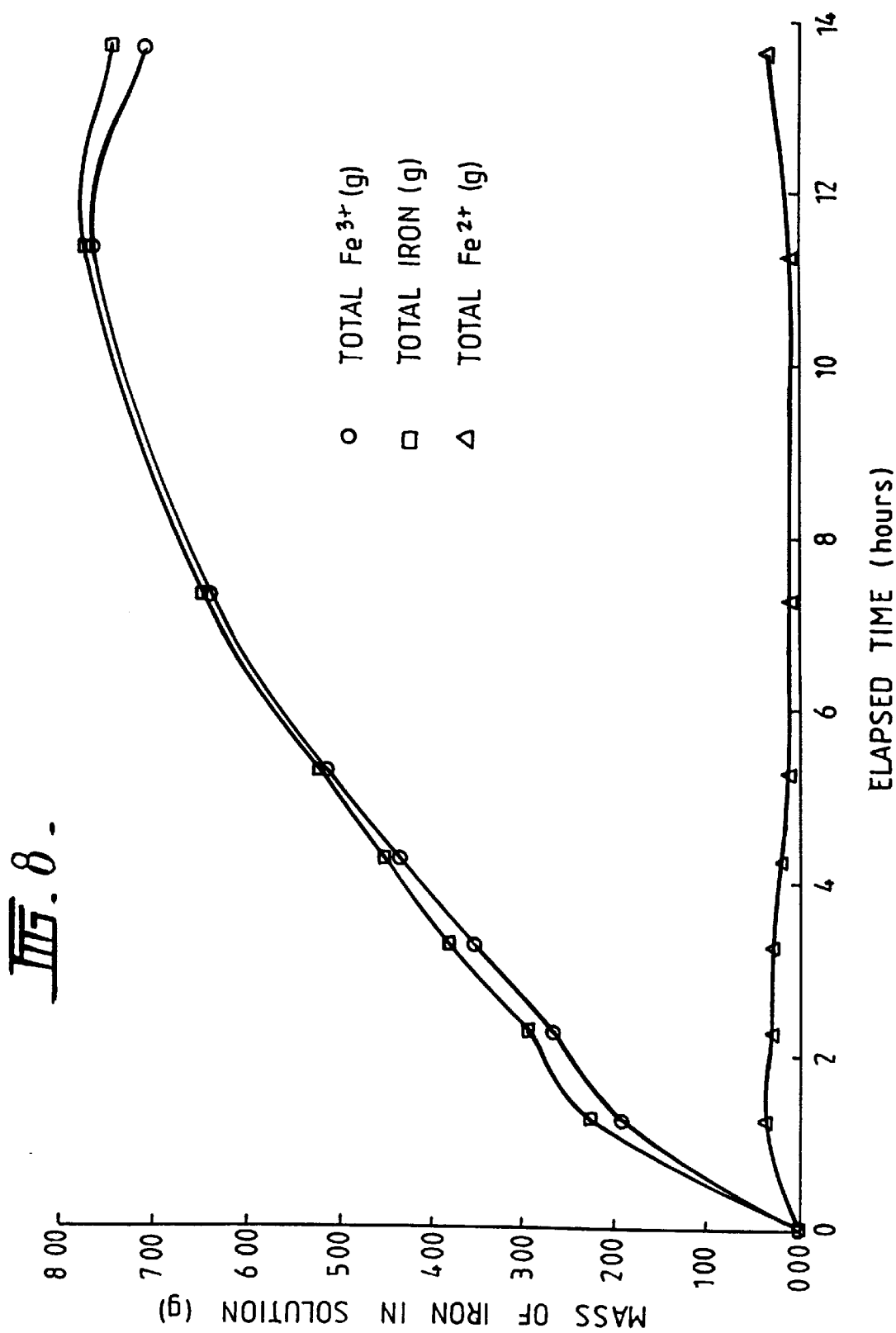

An important result of the experiment was that the ferric ions were derived wholly from the ore body. This result is reflected by FIG. 8 which is a plot of the concentration of iron in solution against time. The figure shows that the concentration of iron increased at a substantially constant rate over the first 8 hours of the experiment and then levelled off.

In summary the experimental work carried out by the applicant establishes the feasibility of oxidising a sulphide mineral by ferric ions, oxidising the ferrous ions produced by the ferric ion oxidation of sulphide minerals by $SO_2/O_2$, and relying on the sulphide mineral or an ore body which contains the sulphide mineral as a source of ferrous/ferric ions.

Many modifications may be made to the preferred embodiment of the present invention without departing from the spirit and scope of the present invention.

What is claimed is:

1. A method of treating a mined material or a concentrate of the mined material to improve the recovery of a valuable metal from the mined material, the mined material including a sulphide mineral, the sulphide mineral containing the valuable metal and iron and being pyrite and/or arsenopyrite, which method produces a treated product and comprises:

(i) oxidising the sulphide mineral in the presence of ferric ions to produce ferrous ions, the purpose being to make the valuable metal in the sulphide mineral more accessible to extraction; and (ii) oxidising the ferrous ions generated in step (i) or present in the mined material with a mixture of sulphur dioxide and oxygen to produce ferric ions for use in oxidising the sulphide mineral in step (i).

2. The method defined in claim 1 comprising oxidising the ferrous ions in step (ii) at a temperature of at least 60° C.

3. The method defined in claim 1 comprising controlling the ratio of sulphur dioxide to oxygen to be in the range of 0.5 to 10%.

4. The method defined in claim 1 comprising oxidising the sulphide mineral and the ferrous ions in steps (i) and (ii), respectively, under acidic conditions.

5. The method defined in claim 1 comprising carrying out steps (i) and (ii) simultaneously in the same vessel.

6. The method defined in claim 1 comprising carrying out steps (i) and (ii) separately in different vessels.

7. A method of extracting a valuable metal from a mined material or a concentrate of the mined material, the mined material including a sulphide mineral containing the valuable metal, the sulphide mineral being pyrite or arsenopyrite, the method comprising:

(i) treating the mined material or a concentrate of the mined material in accordance with claim 1 to form a treated product; and (ii) extracting the valuable metal from the treated product.

8. The method defined in claim 1 comprising oxidising the sulphide mineral in step (i) in the presence of a catalyst.

9. The method defined in claim 2 wherein the temperature is at least 80° C.

10. The method defined in claim 3 wherein the ratio of sulphur dioxide to oxygen is 2%.

11. The method defined in claim 4 comprising oxidising the sulphide mineral and ferrous ions in steps (i) and (ii), respectively, at a pH of less than 3.

* * * * *